July 29, 1952  P. G. SNYDER ET AL  2,604,971
STRAIGHTENING SHEET MATERIAL
Filed July 11, 1949  2 SHEETS—SHEET 1
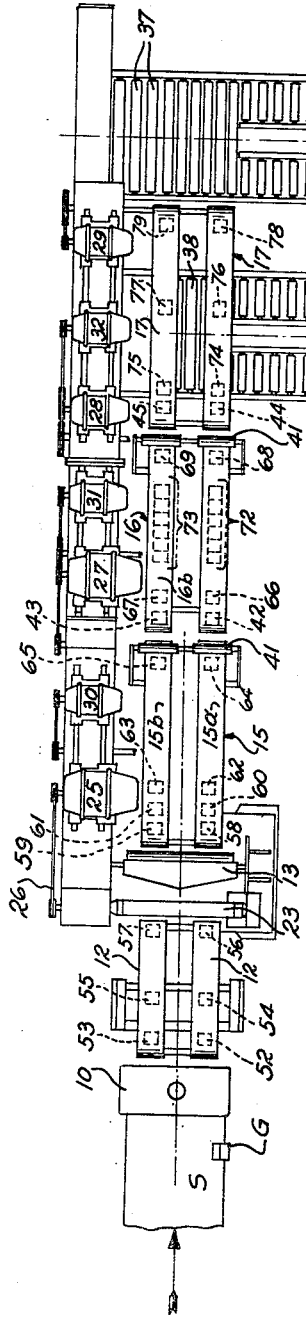
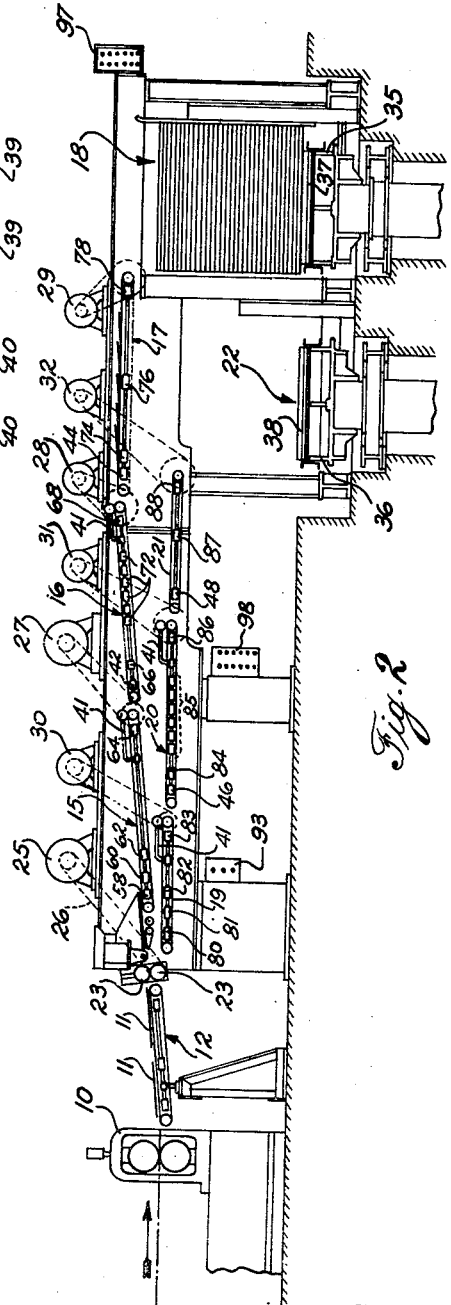
INVENTORS
PERRY G. SNYDER
& NEIL T. GORDON
BY
Bosworth & Sessions
ATTORNEYS July 29, 1952  P. G. SNYDER ET AL  2,604,971
STRAIGHTENING SHEET MATERIAL
Filed July 11, 1949  2 SHEETS—SHEET 2
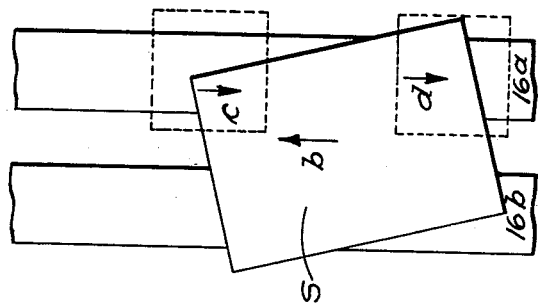
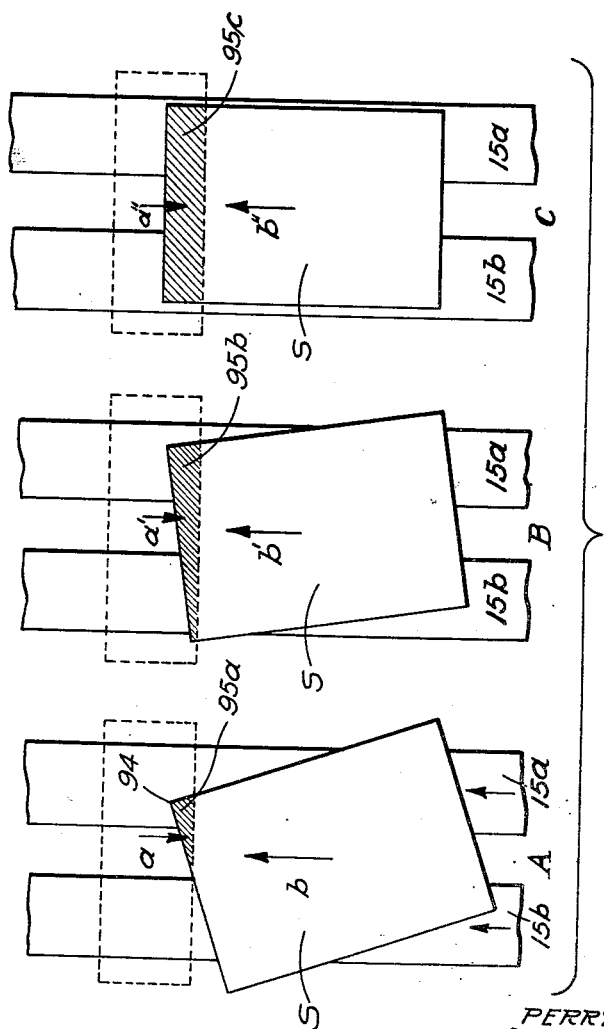
INVENTORS
PERRY G. SNYDER
& NEIL T. GORDON
BY
Bosworth & Sessions
ATTORNEYS Patented July 29, 1952

2,604,971

UNITED STATES PATENT OFFICE 2,604,971

STRAIGHTENING SHEET MATERIAL

Perry G. Snyder, Youngstown, and Neil T. Gordon, Struthers, Ohio, assignors to The Aetna-Standard Engineering Company, Youngstown, Ohio, a corporation of Ohio Application July 11, 1949, Serial No. 104,078

12 Claims. (Cl. 198—29)

This invention relates to conveyors for sheet material, and particularly to conveyors of the type employed in classifying lines in which tin plate and the like in strip form is sheared into sheets, separated in accordance with its thickness as determined by a gauge and conveyed and piled in separate piles of on-gauge and off-gauge sheets. The invention is described herein in its application to the production of tin plate, but it is to be understood that the invention may be used in conjunction with other materials and other types of apparatus, and that the description of the preferred forms of the invention contained herein is given only by way of example.

Apparatus for classifying sheet metal such as tin plate are well known, one successful type of apparatus being shown, for example, in United States Patent No. 2,291,261, issued July 28, 1942, to Clarence L. Taylor; in the present application the invention is described as applied to a classifier of the general type disclosed in said Taylor patent. In the operation of such classifiers, tin plate in strip form is first gauged by a flying micrometer, then sheared into sheets by a flying shear. The sheets are discharged onto a belt conveyor moving at a speed substantially higher than the speed of the strip entering the shear so that the sheets are spaced on the belt conveyor. From the belt conveyor, the sheets pass to a classifying station which comprises a flipper arranged to pass sheets of the desired thickness, as determined by the gauge, to one flight or series of conveyors and to deflect sheets which are not of the desired gauge to another flight or series of conveyors. The flipper is operated from the flying micrometer by suitable electrical means with appropriate time delay. This type of operation is disclosed in the aforesaid Taylor patent and also in the Kaufman Patent No. 2,146,581, issued February 7, 1939.

The on-gauge or prime flight of conveyors and the reject flight of conveyors lead to separate pilers on which the prime and off-gauge sheets, respectively, are deposited. In order to prevent damage to the sheets in the piling operation and to insure the production of accurate piles, the sheets are slowed down as they travel along the flights of conveyors and are discharged onto the pilers at speeds considerably less than the speed of the strip entering the shear.

In order to obtain high production and economical operation of the classifiers, the shearing and classifying operations are carried out at high strip speeds, say of the order of 1,000 feet per minute. The high speeds introduce serious problems in connection with the handling of the sheets in their travel along the conveyors. Many of the difficulties which have heretofore prevented the operation of classifiers at desired high speeds are due to the fact that some irregularity in the action of the shear or some other irregularity in the classifying apparatus, for example, in the flipper or in one of the high speed conveyor belts, may result in the sheets becoming askew in their travel through the apparatus; that is, the longitudinal edges of the sheets may become non-parallel to the direction of travel through the conveyor and the direction of movement of the conveyor belts. When this occurs at high speeds, the sheets may have a tendency to sail through the air rather than to lie flat on the conveying belts, or they may be violently twisted by the action of a burr on the edges of the sheets engaging a conveyor belt traveling at a speed different from the speed of the sheet, or the sheets may be otherwise deflected from their proper paths, with the result that the sheets may jam in their travel through the classifier or may jam as they enter the pilers. In such cases, a large number of sheets pile up in a short period of time; many of these sheets are spoiled, and it becomes immediately necessary to stop the shear and classifier and spend valuable time in clearing out the classifier to place it in operable condition again.

The present invention has for its object the provision of a method and apparatus for preventing sheets from becoming seriously askew in their travel through the classifier and for straightening sheets that are askew thereby making it possible to operate the classifier at higher speeds than heretofore could be attained, and at the same time substantially eliminating piling up of sheets and jamming of the classifier. Other objects of the invention include the provision of a classifier or other high speed conveyor having the foregoing advantages and which is relatively simple in construction and operation, the provision of such a classifier in which the straightening operation takes place automatically, and the provision of a classifier embodying manually controllable means for straightening the sheets in their passage through the apparatus.

Further objects and advantages of the invention will become apparent from the following description of a preferred embodiment thereof, reference being made to the accompanying drawings. The essential characteristics are summarized in the claims.

In the drawings, Figure 1 is a somewhat schematic plan view of a classifier embodying our invention, illustrating in addition to the classifier proper a micrometer for gauging the strip and a flying shear for shearing the strip into sheets; Figure 2 is an elevation of the apparatus shown in Figure 1; and Figures 3 and 4 are diagrams schematically illustrating the operation of our straightening method and apparatus.

The sheets traveling through classifiers of the type to which the present invention is particularly applicable, ordinarily are rectangular in shape. Thus, when the sheet is straight, the leading edge of the sheet is perpendicular to the conveyor belts. When the sheet becomes askew, the leading edge is no longer perpendicular to the conveyor belts and one corner of the leading edge becomes advanced over the other corner of the leading edge.

Briefly, our invention contemplates a classifier or conveyor structure in which the sheets are progressively slowed down as they travel through the classifier and in which retarding forces are applied to the sheets as they travel through the classifier with the resultant of all of the retarding forces acting on the same side of the center of gravity of the sheet as the leading corner of the sheet. The resultant of these forces together with the momentum of the moving sheet, which can be regarded as acting at the center of gravity of the sheet, comprises a couple which tends to rotate the sheet so that its sides become parallel with the axis of the belt conveyor. Preferably, the retarding forces are applied by means of magnets disposed beneath the conveyor belts.

In a preferred form of classifier embodying the invention, the arrangement of one magnet or group of magnets is such as to automatically apply a straightening force to the sheets regardless of the direction in which they are skewed, and the arrangement of a subsequent group of magnets is such that the retarding forces may be applied to one side or the other of the sheets as desired, this second group of magnets being under the control of the operator in contrast to the automatic operation of the first group.

As shown in Figures 1 and 2, a strip S of tin plate or other magnetic material to be classified is first passed through a flying micrometer or other suitable gauge G and then to the flying shear 10 which shears it into sheets 11, a few of which are shown in various locations on the conveyor belts in Figure 2 of the drawings. From the shear the sheets severed from the strip are deposited on the first conveyor 12 which, like the conveyors disclosed in the aforesaid Taylor patent and the remaining conveyors in the classifier, is made up of a pair of spaced parallel belts which operate on rollers or pulleys at the ends of the belts.

The conveyor 12 is driven at a substantially greater speed than the speed of the strip entering the shear so that the sheets 11 are spaced because of the increased speed of the conveyor 12. For example, if the strip entering the shear is traveling at a speed of 1,000 feet per minute, the conveyor 12 may be operated at a speed of 1,133 feet per minute. The purpose of the increased speed of operation is to space the sheets apart to give time for the deflector 13 to operate in accordance with the signals given to it by the flying micrometer G, the sheets being delivered to the deflector 13 from the conveyor 12. The arrangement is such that sheets within the established gauge tolerances pass directly over the flipper or deflector 13 onto the on-gauge or prime flight made up of conveyors 15, 16 and 17 and leading to piler 18, while sheets that are not within the established tolerances are deflected downwardly by the flipper 13 onto the reject flight made up of conveyors 19, 20 and 21 and leading to the piler 22. If desired, a pair of burr masher rolls 23 may be disposed immediately in front of the flipper 13, to crush and smooth the sheared edges of the sheets before they pass to the prime flight and to the reject flight.

As previously noted, each conveyor is made up of two parallel belts, and the several conveyors are provided with individual motor drives, motor 25 driving conveyor 12 through chain 26, and motors 27, 28 and 29 driving conveyors 15, 16 and 17, respectively, through similar chains. The conveyors 19, 20 and 21 of the reject flight are similarly driven by motors 30, 31 and 32. The speeds of the motors are preferably individually controllable by means of rheostats or other appropriate controls not shown, and the speed of the shear 10 is likewise independently controllable. Preferably the speeds of all of the motors in the line can also be simultaneously varied by means of a variable voltage control supplying current to the shear motor and all of the conveyor motors.

The sheets discharged by the last belts in each flight drop onto the pilers 18 and 22 which consist of elevating platforms 35 and 36 having their upper surfaces made up of conveyor rolls 37 and 38. These platforms are raised at the beginning of a run and gradually lowered by the operator as sheets accumulate on them, and roller conveyors 39 and 40 are provided for removing piled sheets from the platforms in lateral directions.

The construction and operation of the apparatus just described are generally the same as the construction and operation of the aforesaid Taylor patent. In operation, with a lineal speed of the strip entering the shear of, for example, 1,000 feet per minute, the conveyor 12 will be operated at approximately 1,133 feet per minute. After the sheets have passed the flipper 13, they are gradually slowed down as they travel along conveyors 15, 16 and 17, these conveyors being operated at speeds of approximately 1,066, 640 and 300 to 450 feet per minute, respectively. The conveyors 19, 20 and 21 in the lower flight are operated at approximately the same speeds as the conveyors 15, 16 and 17.

At such speeds it has been found desirable to provide hold-down rolls 41, at the exit end of each conveyor belt. These rolls which are preferably of rubber or other resilient material help to control the sheets as they leave the conveyors by minimizing the tendency of the fast moving sheets to sail or plane through the air as they are transferred to the next conveyor. As indicated in the drawings the hold-down rolls are pivotally mounted to bear upon the conveyor belts adjacent the end pulleys and are driven only by the sheets and the conveyor belts passing beneath them. In conjunction with these hold-down rolls it has been found desirable, though not always necessary, to provide magnetic means to aid in the transfer of the sheets from one conveyor to the next. For example, the front end of the conveyors 16 and 17 in the prime flight have pairs of magnets indicated at 42 and 43 and 44 and 45 disposed beneath the belts closely adjacent the end pulleys of the belts. These end magnets tend to draw the sheets into contact with the belts as soon as the sheets are free of the hold-down rolls 41 and thus tend to minimize planing of the sheets and otherwise help in the transfer of the sheets from one conveyor to another. Similar end magnets are provided for the conveyors 20 and 21 of the reject flight as indicated at 46 and 48, respectively. These end magnets however have only a momentary influence on the fast moving sheets and then only on the trailing edges thereof, so that they do not exert any appreciable retarding action on the sheets. The sheets are still traveling at speeds greater than the speed of the belts after leaving the magnetic fields of the end magnets.

At these high conveyor speeds, too, it is necessary not only to provide means to aid in the transfer of sheets from one conveyor to the next but also to employ additional means to keep the sheets on the belts and to prevent them from planing through the air. In the Taylor patent, magnets disposed beneath the belts are employed for this purpose. Magnets are employed for the same purpose in the present apparatus, but in addition the magnets in the present invention are arranged not only to hold the sheets on the conveyor belts but also to straighten out sheets that have become askew in their passage from the shear and along the conveyors.

To this end, magnets are disposed in pairs beneath the upper reaches of the conveyor belts. In order to hold the sheets on the first conveyor 12, pairs of magnets 52 and 53, 54 and 55, 56 and 57 are provided; pairs of magnets 58 and 59, 60 and 61, 62 and 63, and 64 and 65 are disposed beneath the upper reaches of the belts in conveyor 15; pairs of magnets 66 and 67, 68 and 69 are disposed as shown adjacent the ends of the belts comprising conveyor 16, while two series of magnets 72 and 73 are disposed beneath the intermediate portions of the belts making up conveyor 16. Pairs of magnets 74 and 75, 76 and 77, and 78 and 79 associated with the conveyor 17 complete the magnets in the upper or prime flight of conveyors. A similar arrangement of magnets is provided for the conveyors 19, 20 and 21 in the lower flight, the magnets beneath the right-hand belts of these conveyors being indicated by reference characters 80, 81, 82, 83, 84, 85, 86, 87 and 88. Similar magnets, which do not show in the drawings, are provided beneath the left-hand belts of the conveyors 19, 20 and 21. All of the magnets may conveniently be supported in the manner disclosed in the aforesaid Taylor patent.

As noted above, according to the present invention, retarding forces are applied to the sheets as they travel through the classifier in such manner as to tend to straighten out any sheets which may become askew. Preferably, these forces are applied by means of the straightening magnets, and the operation and effect of the straightening magnets will be described with particular reference to the upper flight made up of conveyors 15, 16 and 17, it being understood that the same type of operation takes place in the lower flight made up of conveyors 19, 20 and 21. It is to be understood also that the operation described herein is applicable to classifiers having three flights of conveyors.

As previously described conveyor 12 may be operated at a speed of, for example, 1,133 feet per minute, whereas conveyor 15, which receives sheets 11 from conveyor 12, is operated at a considerably slower speed, for example, 1,066 feet per minute. Thus, as the sheets 11 slide over the flipper 13 and onto the conveyor 15, they are traveling at a substantially higher velocity than the belts of conveyor 15. Because of their high velocity, they may be partially supported by the air through which they travel, and on the initial portions of conveyor 15, touch the belts very lightly so that the retarding action of the belts 15a and 15b of conveyor 15 on the sheets is very slight. However, this action is changed when the sheets reach the fields of magnets 58 and 59, the magnets 60 and 61 and 62 and 63 not being energized as will be explained later. As the sheets enter the magnetic fields, two effects take place—a retarding force is exerted on the sheets by reason of the eddy currents generated in the sheets as they cut the lines of force of the magnetic fields, and furthermore, and perhaps more importantly, the sheets are drawn down into engagement with the belts, thus increasing the frictional resistance to sliding of the sheets along the belts and imposing a further retarding force on the sheets because of the fact that the belts 15a and 15b are operating at a speed slower than the speed of travel of the sheets. It is also to be noted that, the magnets 58 and 59 are spaced from the burr masher rolls by a distance greater than the length of the sheets so that the sheets will be traveling freely along the belts without restraint at the time they enter the field of magnets 58 and 59. In order to provide this spacing of the magnets from the burr masher rolls for various length sheets the magnets 58 and 59 may be movable along the conveyor or it may be more convenient to provide a plurality of magnets which are independently energizable. For example, when short sheets are being classified magnets 58 and 59 are energized as in the present example, while for longer sheets magnets 60 and 61 will be energized and for still longer sheets magnets 62 and 63 will be energized. A switchboard 93 having appropriate switches for energizing the magnets 58, 59, 60, 61, 62 and 63 as desired is therefore provided.

Under these circumstances, the action of the magnets 58 and 59 is to exert a retarding force on the sheets which tends to straighten up the sheets and bring their edges into parallelism with the belts regardless of the direction in which they may be skewed. This action is illustrated diagrammatically in Figure 3. In diagram A of this figure, sheet S is traveling along belts 15a and 15b at a speed greater than the speed of the belts with its longitudinal edges rotated considerably out of alignment with the belts. The leading corner 94 of the sheet thus enters the magnetic field of magnets 58 and 59, the approximate boundaries of the effective portion of the field being indicated by the broken lines in the diagram, before any other portion of the sheet. After a very small interval of time, the triangular shaded portion 95a of the sheet is effectively in the magnetic field and retarding forces are created by the cutting of the magnetic lines of force by this portion of the sheet and by the frictional engagement between this portion of the sheet and the belt 15a which is enhanced as compared to the remainder of the sheet by the action of the magnet. The resultant of the retarding forces may be considered as being applied to the center of gravity of the triangular shaded portion 95a; the resultant acting approximately as indicated by the arrow $a$ in Figure 3A. The momentum of the sheet may be considered as concentrated at the center of gravity of the sheet and acting in the direction of the arrow $b$ in Figure 3A. Thus, the retarding force is offset from the center of gravity of the sheet, and the resultant of the retarding forces together with the momentum of the sheet constitutes a couple tending to rotate the sheet in a direction to bring the edges of the sheet in parallelism with the belt.

In Figure 3B the sheet has rotated partially toward parallelism. The shaded area 95b is of trapezoidal shape extending across the entire sheet, and the retarding force as indicated by the arrow a' has moved closer to alignment with the center of gravity of the sheet, and to alignment with the arrow b' indicating the momentum, thus reducing the arm of the couple and reducing the turning moment as the sheet approaches straightness.

In Figure 3C the edges of the sheet are parallel with the belt. The shaded area 95c is a rectangle. The retarding force acts through the center of gravity of the rectangle which is in alignment with the center of gravity of the sheet. Thus, the arrow a'', indicating the retarding force, is in alignment with the arrow b'' indicating the momentum, and there is no resultant couple tending to rotate the sheet.

Obviously the straightening action will take place equally well regardless of the direction in which the sheet may be skewed; the magnetic fields on either side of the axis or center line of the conveyor being substantially equal.

The straightening action of the magnetic field on the sheets as they are being retarded and turned toward straightened position is somewhat akin to the phenomenon of refraction. However, even in the case where a sheet is not entirely straightened out by the force applied to the sheet as it enters the magnetic field, there is no reverse action when the trailing edge of the sheet leaves the magnetic field because the sheets will have been so substantially straightened that any slight residual skewness of the trailing edge will produce only a very weak turning couple when it enters the magnet field. Thus, the skewness of the leading corner which initially is relatively great produces a relatively strong straightening couple which acts to straighten the sheet so that the trailing corner has little or no skewness to exert a reversing force. Moreover, by the time the trailing corner of the sheet comes within the magnetic field the sheet will be traveling at substantially belt speed, and the sheet will be held against the belts by the magnets firmly enough to resist whatever slight amount of retarding action is exerted by the magnetic field on the trailing corner of the sheet. The sheet thus has no tendency to swing away from its substantially straightened position.

Thus, with this arrangement, sheets which are askew are automatically straightened, at least in part, as they travel from conveyor 12 to conveyor 15, and the rejected sheets are similarly automatically straightened as they travel from conveyor 12 to conveyor 19. It will be appreciated that the automatic straightening magnets may be employed elsewhere in the apparatus so long as the sheets are slowed down by the magnets and preferably so long as the sheets are traveling without substantial restraint except for the normal frictional engagement between the sheets and the belts and at a higher velocity than the belts with which the magnets are associated as the sheets approach the magnets.

It may happen that the sheets are not entirely straightened by the automatic straightening magnets 58 and 59 and the corresponding magnets in the lower flight of conveyors. To provide for the application of further straightening forces to the sheets before they reach the piler, we preferably employ groups of magnets 72 and 73 in association with the conveyor 16. These magnets are arranged to be independently controllable by the operator at the push button switch-board 97, the buttons in one row controlling the energization of the individual magnets making up the group 72 and the buttons in the other row controlling the energization of the magnets making up the group 73. By energizing the magnets on one side or the other to a greater or lesser degree, the operator can apply retarding forces to one side or the other of sheets traveling along the conveyor 16.

Inasmuch as the conveyor 16 is traveling at a lesser speed than the conveyor 15, the operation of these magnets, like the magnets 58 and 59, is two-fold in that they not only increase the frictional engagement between the belt and the portion of the sheets upon which the magnets act, but also the cutting of the magnetic lines of force by the sheets imposes an additional retarding force. Thus, as shown in Figure 4, a sheet S traveling along the belts 16a and 16b may have substantial retarding forces applied to it acting in the direction of the arrows c and d in Figure 4 by reason of the magnetic fields created by energization of magnets making up the group 72, the magnetic fields again being indicated by dotted lines. The forces c and d are offset from the center of gravity of the sheet and thus act with the momentum of the sheet indicated by the arrow b to apply a rotating couple to the sheet to turn it and bring it into parallelism with the belts 16a and 16b.

The amount of the retarding force can be controlled by the operator by energization of one or more of the magnets making up the group. In practice, it is possible to control very accurately the alignment of the sheets on the conveyor. The operator has it within his power to straighten crooked sheets or, if he wishes, to turn straight sheets. Ordinarily, in the operation of a shear line and classifier, sheets will run through the classifier for a relatively long period of time with each sheet skewed in substantially the same manner. Thus, the operator needs only to energize the magnets to correct the particular skewness of the sheets, and as this will ordinarily persist for some time frequent adjustments of the energization of the magnets are not necessary. Frequently an entire coil of strip may be run through the machine with a single adjustment. Of course, in many instances the operation is such that the automatic straightening effected by the magnets 58 and 59 and the corresponding magnets in the lower flight is sufficient.

It is to be understood that the corresponding banks of magnets beneath the belts of the conveyor 20 in the lower flight are controlled by the push button switch-board 98 in a similar manner to control the position of sheets traveling through the lower flight of conveyors.

The apparatus is highly advantageous in operation inasmuch as it makes possible high speed operation of the conveyors with very little likelihood of pile-ups of the sheets in the conveyors or pilers. The sheets are shingled accurately as they are delivered from belts 16 and 20 to belts 17 and 21, respectively, and are deposited on the pilers accurately with their edges in alignment and without likelihood of damage to the corners of the sheets. Thus, the invention not only makes possible increased production but also results in a higher quality product by preventing damage to the material as it travels through the apparatus.

It will be evident that various changes and modifications can be made in our invention without departing from the spirit and scope thereof. Thus, the invention may be applied to various types of conveyors for sheet material, and the usefulness of the invention is not limited to tin plate, but also may be employed with other sheet materials which must be handled rapidly and accurately. It is therefore to be understood that the foregoing description is given by way of example only and that the invention is defined by the scope of the appended claims.

We claim:

1. In a conveyor system for classifiers and the like embodying a belt conveyor, means adapted to transfer sheets of magnetic material to said conveyor at a speed greater than the speed of said conveyor, magnetic means associated with said conveyor adapted to exert retarding forces on sheets which lie askew on said conveyor while said sheets are traveling at a speed exceeding the speed of the conveyor, the resultants of said forces lying to one side of the centers of gravity of said sheets and tending to rotate said sheets toward straightened position.

2. Apparatus for handling sheet material comprising a conveyor, means for feeding sheets of magnetic material onto said conveyor at a speed exceeding the speed of said conveyor and magnetic means associated with said conveyor adapted to exert retarding forces on sheets lying askew on said conveyor to rotate said sheets toward straightened position.

3. Apparatus for handling sheet material comprising a conveyor, means for feeding sheets onto said conveyor at a speed exceeding the speed of said conveyor, and means associated with said conveyor adapted to exert retarding forces on sheets lying askew on said conveyor to rotate said sheets toward straightened position.

4. In a conveyor system for sheet classifiers or the like, a belt conveyor, means adapted to transfer sheets of magnetic material to said conveyor at a speed greater than the speed of said conveyor, stationary magnets for producing a substantially uniform magnetic field symmetrical with respect to the axis of said conveyor and adapted to exert retarding forces on sheets which lie askew on said conveyor while said sheets are traveling at a speed exceeding the speed of the conveyor, the resultants of said forces lying to one side of the centers of gravity of said sheets to rotate and straighten said sheets.

5. In a conveyor system for classifiers and the like, a conveyor, means to transfer sheets of material to said conveyor, means adapted to exert retarding forces on sheets which lie askew on said conveyor comprising magnets associated with said conveyor, and means for controlling the energization of said magnets on either side of the axis of the conveyor to produce an asymmetric magnetic field and exert retarding forces on said sheets to rotate and straighten said sheets.

6. In combination with a belt conveyor, means for straightening sheets of magnetic material which are askew in their travel along said conveyor, including means to transfer said sheets to said conveyor at a speed greater than the speed of said conveyor, magnets positioned below the belts of said conveyor and disposed symmetrically with respect to said conveyor and means for independently controlling the energization of said magnets on either side of the axis of the conveyor to produce asymmetrical magnetic fields with respect to the axis of said conveyor, said magnets being located along said belt conveyor in a position where said sheets are traveling at a speed exceeding the speed of the conveyor.

7. In a conveyor for sheet material having a first section and a second section, the first section being adapted to feed sheets onto the second section of the conveyor at a speed greater than the speed of said second section; means associated with said first section for holding the sheets in contact therewith, means associated with said second section for exerting retarding forces on sheets which lie askew on said second section while said sheets are traveling at a speed exceeding the speed of said second section, the resultants of said forces lying to one side of the centers of gravity of said askew sheets and tending to rotate said sheets toward straightened position, said means associated with said second section being spaced from said holding means associated with said first section by a distance at least as great as the length of the sheets being conveyed.

8. In a conveyor for magnetic sheet material having a first belt conveyor section and a second belt conveyor section, the first section being adapted to feed sheets onto the second section of the conveyor at a speed greater than the speed of said second section; magnetic means disposed beneath the belt of said first section for holding the sheets in contact therewith, magnetic means disposed beneath the belt of said second section for exerting retarding forces on sheets which lie askew on said second section while said sheets are traveling at a speed exceeding the speed of said second section, the resultants of said forces lying to one side of the centers of gravity of said askew sheets and tending to rotate said sheets toward straightened position, said magnetic means associated with said second section being spaced from said first section by a distance at least as great as the length of the sheets being conveyed.

9. In a conveyor system for classifiers and the like, a first conveyor adapted to convey sheets of material at a relatively high speed, a second conveyor traveling at a slower speed and adapted to receive sheets form said first conveyor, means associated with said first conveyor adapted to hold sheets on said first conveyor, means associated with said second conveyor adapted to produce retarding forces which are asymmetric with respect to the centers of gravity of sheets lying askew on said second conveyor to produce a couple tending to rotate each such sheet toward straightened position, said means associated with said second conveyor being spaced from the said holding means associated with said first conveyor by a distance at least as great as the length of the sheets being classified.

10. In a conveyor system for classifiers and the like, a first conveyor adapted to convey sheets of material at a relatively high speed, a second conveyor traveling at a slower speed and adapted to receive sheets from said first conveyor, magnetic means associated with said first conveyor adapted to hold sheets on said first conveyor, magnetic means associated with said second conveyor adapted to create a uniform magnetic field symmetrical with respect to the axis of said second conveyor whereby to produce retarding forces which are asymmetric with respect to the centers of gravity of sheets lying askew on said second conveyor to produce a couple tending to rotate each sheet toward straightened position, said magnetic means associated with said second conveyor being spaced from said first conveyor by a distance at least as great as the length of the sheets being classified.

11. In a high speed conveyor system for sheets of magnetic material, a first belt conveyor, magnetic means lying beneath the belts of said conveyor for holding sheets of magnetic material in contact with said belts, said first conveyor being adapted to deliver said sheets onto a second belt conveyor at a speed exceeding the speed of said second conveyor, magnetic means lying beneath the belts of said second conveyor adapted to create a magnetic field which is substantially symmetrical with respect to the axis of said second conveyor whereby to exert retarding forces on sheets lying askew on said second conveyor while said sheets are still traveling at a speed greater than the speed of said second conveyor, the resultants of said retarding forces being offset from the centers of gravity of said askew sheets whereby to tend to rotate said askew sheets toward straightened position, said magnetic means associated with said second conveyor being spaced from said first conveyor by a distance not less than the length of said sheets, and a third belt conveyor adapted to receive sheets from said second conveyor and traveling at a slower speed than said second conveyor, a third magnetic means lying beneath the belts of said third conveyor, and means to control the energization of the magnets comprising said third magnetic means independently on either side of the axis of said third conveyor to produce a magnetic field which is asymmetric with respect to the centers of gravity of sheets disposed on said third conveyor to apply rotating forces to said sheets.

12. In a high speed classifier for sheets of magnetic material having a first belt conveyor adapted to receive sheets to be classified, magnetic means associated with said first conveyor for holding sheets on the belts thereof, and a deflector at the delivery end of said first conveyor adapted to deflect sheets delivered by said first conveyor to either of two second belt conveyors; each of said second belt conveyors being provided with magnetic means adapted to create a magnetic field which is substantially symmetrical with respect to the axis of the conveyor with which the magnetic means is associated whereby to exert retarding forces on sheets lying askew on said second conveyor while said sheets are still traveling at a speed greater than the speed of said second conveyor, the resultants of said retarding forces being offset from the centers of gravity of said sheets whereby to tend to rotate said sheets toward straightened position, said magnetic means associated with said second conveyors being spaced from said first conveyor by distances not less than the length of the sheets being classified whereby said sheets are substantially free from restraint when they enter the magnetic field associated with said second bent conveyors.

PERRY G. SNYDER.
NEIL T. GORDON.

REFERENCES CITED

The following references are of record in the file of this patent:

UNITED STATES PATENTS

| Number | Name | Date |
|---|---|---|
| 1,777,139 | Fitzgerald | Sept. 30, 1930 |
| 2,190,418 | Davidson | Feb. 13, 1940 |

FOREIGN PATENTS

| Number | Country | Date |
|---|---|---|
| 479,675 | Germany | July 20, 1929 |